United States Patent
Moriyama et al.

[11] Patent Number: 5,697,856
[45] Date of Patent: Dec. 16, 1997

[54] SOLID GOLF BALL AND PROCESS FOR PRODUCING THE SAME

[75] Inventors: Keiji Moriyama, Shirakawa; Hidenori Hiraoka, Akashi; Kazushige Sugimoto, Shirakawa; Satoshi Iwami, Himeji; Masatoshi Yokota, Shirakawa, all of Japan

[73] Assignee: Sumitomo Rubber Industries, Ltd., Hyogo-ken, Japan

[21] Appl. No.: 536,532

[22] Filed: Sep. 29, 1995

[30] Foreign Application Priority Data

Sep. 30, 1994 [JP] Japan ................... 6-261301

[51] Int. Cl.$^6$ .................. A63B 37/06; A63B 37/12
[52] U.S. Cl. ............................. 473/374; 473/377
[58] Field of Search .................. 473/373, 377, 473/374, 372

[56] References Cited

U.S. PATENT DOCUMENTS

| | | | |
|---|---|---|---|
| 3,239,228 | 3/1966 | Crompton | 473/377 |
| 5,184,828 | 2/1993 | Kim et al. | 473/373 X |
| 5,553,852 | 9/1996 | Higuchi et al. | 473/373 |

FOREIGN PATENT DOCUMENTS 1168609  10/1969  United Kingdom .

OTHER PUBLICATIONS

WPI Abstract Accession No. 86-282134/43 & JP 61206469 A 12 Sep. 1986.

*Primary Examiner*—George J. Marlo
*Attorney, Agent, or Firm*—Birch, Stewart, Kolasch & Birch, LLP

[57] ABSTRACT

A solid golf ball comprising a core and a cover, wherein the core has a trans structure content in polybutadiene of 10 to 30%. The core is produced by vulcanizing a rubber composition containing a butadiene rubber having cis structure content of not less than 90% before vulcanization, as a base rubber, wherein an amount of trans structure after vulcanization is 10 to 30% and a difference in hardness measured by a JIS-C type hardness tester between the center of the core and each point located from the center to the surface at an interval of 5 mm is not more than 10%.

The rubber composition for forming the core comprises a vulcanizing agent, a filler, an organic peroxide and an organophosphorus compound, in addition to the butadiene rubber having cis structure content of not less than 90% before vulcanization.

9 Claims, 1 Drawing Sheet

SOLID GOLF BALL AND PROCESS FOR PRODUCING THE SAME

FIELD OF THE INVENTION

The present invention relates to a solid golf ball, and a process for producing the same. More particularly, it relates to a solid golf ball which has soft and good hit feeling and attains a long flying distance, and a process for producing the same.

BACKGROUND OF THE INVENTION

Golf balls are roughly classified into a solid golf ball and a thread wound golf ball. The former solid golf ball is widely used because of its excellent flying performances, but has a problem that hit feeling is hard in comparison with the thread wound golf ball and very hard hit feeling is afforded at the time of mis-shot, particularly.

Therefore, a study of bringing the hit feeling of the solid golf ball close to that of the thread wound golf ball has recently been made. For example, there is suggested that hit feeling is improved by softening a core of the solid golf ball to soften the whole golf ball.

However, the resilience performances are deteriorated by softening the core, thereby decreasing a flying distance.

OBJECTS OF THE INVENTION

Under these circumstances, the present inventors have paid attention to a change from a cis structure to a trans structure of butadiene rubber used in the core and a hardness distribution of the core of the solid golf ball and studied this issue intensively. As a result, it has been found that, by subjecting the part of the cis structure of the base resin of the core before vulcanization to change so that the amount of trans structure may become 10 to 30% and adjusting the difference in hardness measured by a JIS-C type hardness tester between the center of the core and each point located from the center to the surface at an interval of 5 mm to not more than 10%, the resilience properties are not deteriorated even if the core is softened, thereby affording a solid golf ball which has soft and good hit feeling and attains a long flying distance. Thus, the present invention has been accomplished.

That is, an object of the present invention is to solve the above problems as to the solid golf ball to improve hit feeling without causing deterioration of resilience properties, thereby providing a solid golf ball which has soft and good hit feeling and attains a long flying distance.

This object as well as other objects and advantages of the present invention will become apparent to those skilled in the art from the following description with reference to the accompanying drawing.

SUMMARY OF THE INVENTION

Figure 1:
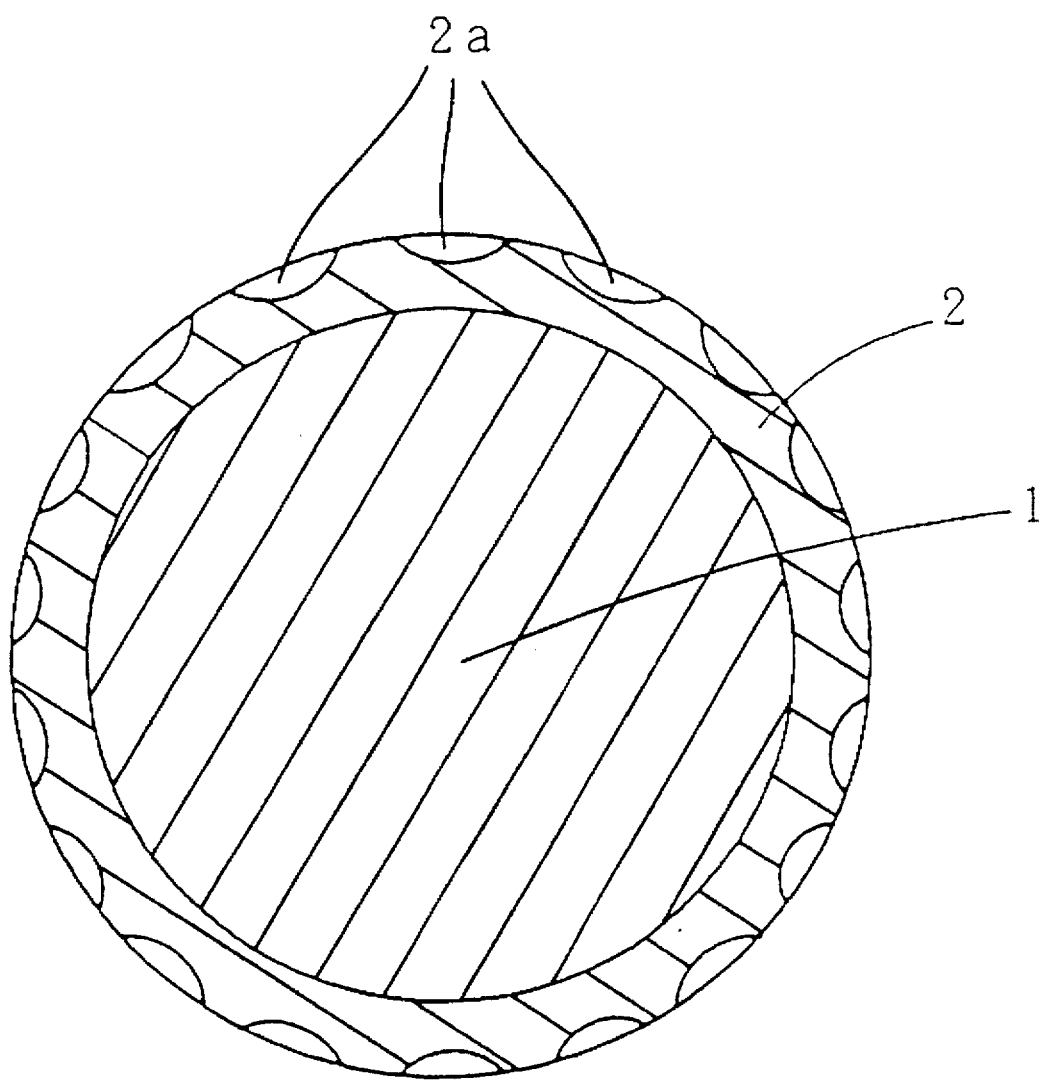
FIGURE 1 is a schematic cross section illustrating one embodiment of the solid golf ball of the present invention.

The present invention provides a solid golf ball which has soft and good hit feeling and attains a long flying distance, wherein the resilience properties are not deteriorated even if the core is softened, by adjusting the trans structure of polybutadiene of the core within the range of 10 to 30%.

DETAILED DESCRIPTION OF THE INVENTION

The rubber composition for forming the above core generally contains a rubber, a vulcanizing agent (crosslinking agent), a filler, an organic peroxide and an organophosphorus compound.

The base rubber can be a butadiene rubber which preferably contains a cis structure content of not less than 90% before vulcanization. The cis structure content is determined by IR spectrum. If necessary, natural rubber, isoprene rubber styrene-butadiene rubber, ethylene-propylene-diene rubber (EPDM), etc. may be added to the above butadiene rubber. Incidentally, it is preferred that an amount of the butadiene rubber containing the cis structure content of not less than 90% is not less than 80% by weight in the rubber component.

The vulcanizing agent is not specifically limited, and various vulcanizing agents can be used. Examples thereof include metal salts of unsaturated carboxylic acids, particularly monovalent or divalent metal salts of unsaturated carboxylic acids having 3 to 8 carbon atoms (e.g. acrylic acid, methacrylic acid, etc.). Among them, zinc acrylate and zinc methacrylate are particularly preferred. An amount of the vulcanizing agent is preferably 20 to 40 parts by weight, particularly 25 to 35 parts by weight, based on 100 parts by weight of the rubber. When the amount of the vulcanizing agent is smaller than the above range, the hardness of the golf ball is low and hit feeling is heavy and inferior. Furthermore, durability is likely to be deteriorated. On the other hand, when the amount exceeds the above range, the golf ball is too hard and hit feeling is likely to be inferior. Since the above metal salt of the unsaturated carboxylic acid contains no sulfur, it may be proper to describe it as crosslinking agent in place of vulcanizing agent. In the present specification, it will be described as the vulcanizing agent. Since the vulcanization of the rubber composition using the above vulcanizing agent is not carried out due to sulfur, it may be proper to describe it as a crosslinking in place of the vulcanization. Similarly, it will be described as the vulcanization in the present specification.

The organic peroxide can be dicumyl peroxide, di-t-butyl peroxide and the like. Among them, dicumyl peroxide is particularly preferred. An amount of the organic peroxide is 0.5 to 5.0 parts by weight, based on 100 parts by weight of the rubber. When the amount is smaller than the above range, the hardness of the golf ball is low and hit feeling is heavy and inferior. On the other hand, when the amount exceeds the above range, the golf ball is too hard and hit feeling is likely to be inferior.

The organophosphorus compound can be diphenyl dusulfide, dixyl disulfide, ditolyl disulfide, etc. It is particularly preferred to use a mixture of three kinds such as diphenyl dusulfide, dixyl disulfide and ditolyl disulfide. A mixing ratio is not specifically limited, but is preferably within a range of 5 to 60:5 to 60:5 to 60, particularly 10 to 50:10 to 50:10 to 50 (diphenyl dusulfide:dixyl disulfide:ditolyl disulfide).

An amount of the above organophosphorus compound is preferably 0.5 to 4 parts by weight, based on 100 parts by weight of the rubber. When the amount of the organophosphorus compound is less than the above range, the change from the cis structure to trans structure is not conducted in a desired degree and it is difficult to make hit feeling soft, thereby attaining a long flying distance. On the other hand, when the amount of the organophosphorus compound exceeds the above range, hit feeling is too soft and resilience performances are deteriorated.

The filler can be zinc oxide, titanium dioxide, barium sulfate, etc. The filler acts as a weight controller and an amount varies depending upon specific gravity, size, etc. of the cover and core. Normally, it is preferably 10 to 40 parts by weight, based on 100 parts by weight of the rubber.

In addition to the above components (rubber, vulcanizing agent, filler, organic peroxide, organophosphorus compound), additives such as antioxidants, etc. can be optionally added to the rubber composition used in the golf ball of the present invention.

The above rubber composition can be prepared by a conventional means which has hitherto been used. When the core is made by using the above rubber composition, the vulcanization is preferably conducted by two-stage vulcanization comprising heating at 135° to 155° C. for 20 to 50 minutes (first stage), followed by heating at 160° to 180° C. for 5 to 20 minutes (second stage). As a result, the change from the cis structure to the trans structure is carried out in the desired degree and the hardness distribution of the core becomes even.

A diameter of the core varies depending upon the thickness of the cover, the presence or absence of the intermediate layer, etc. and is not specifically limited. It is preferably about 35 to 40 mm.

In the present invention, it is necessary that an amount of the cis structure of the butadiene rubber to be used as the base rubber before vulcanization is not less than 90%, because a core having good resilience performances can not be obtained if the butadiene rubber has not such a high-cis structure. Furthermore, the reason why the amount of the trans structure of the base rubber after vulcanization must within a range of 10 to 30% is as follows. When the amount of the trans structure is less than 10%, the resulting core is hard and hit feeling is inferior. On the other hand, when the amount of the trans structure exceeds 30%, the core is too soft and resilience performances are deteriorated. The amount of trans structure (or trans structure content) is determined by IR spectrum.

Regarding the core of the golf ball of the present invention, a difference in hardness measured by a JIS-C type hardness tester (equal to Shore C type hardness tester) between the center of the core and each point located from the center to the surface at an interval of 5 mm must be not more than 10%. What a hardness difference between the center and each point at an interval of 5 mm must be not more than 10% shows that the core is uniformly vulcanized. The change from the cis structure of the base rubber to the trans structure is carried out by such an uniform vulcanization and the presence of the organophosphorus compound, thereby obtaining a solid golf ball which has soft and good hit feeling and attains a long flying distance, wherein resilience performances are not deteriorated even if the core is softened. That is, when the hardness of each point located from the center to the surface at an interval of 5 mm is larger than the hardness of the center of the core by 10% or more, hit feeling is heavy. When the hardness of the center of the core is higher than the above range, an impact force at the time of hitting is too large and hit feeling is likely to is inferior.

A hardness (measured by a JIS-C type hardness tester) of the center of the above core is preferably 60 to 85, particularly 65 to 80. When the hardness of the center of the core is lower than the above range, the core is too soft and hit feeling is heavy. On the other hand, when the hardness of the center of the core is higher than the above range, an impact force at the time of hitting is too large and hit feeling is likely to be inferior.

The structure of the golf ball of the present invention will be explained with reference to the accompanying drawing.

FIGURE 1 is a schematic cross section illustrating one embodiment of the golf ball of the present invention. The golf ball shown in FIGURE 1 is a two-piece solid golf ball comprising a core 1 and a cover 2 covering the core 1. As described above, the core 1 is made by vulcanizing a rubber composition containing a butadiene rubber, which contains cis structure content of not less than 90% before vulcanization, as a base rubber, wherein an amount of a trans structure after vulcanization is 10 to 30% and a difference in hardness measured by a JIS-C type hardness tester between the center of the core and each point located from the center to the surface at an interval of 5 mm is not more than 10%.

Both a resin cover containing an ionomer resin as a main material and a balata cover can be applied to the cover 2. 2a is a dimple and the suitable number/embodiment of dimples 2a may be optionally provided on the cover 2 of the golf ball so as to obtain the desired characteristics. Furthermore, painting, marking, etc. may be optionally provided on the surface of the golf ball.

The golf ball shown in FIGURE 1 is a two-piece solid golf ball wherein a core 1 is directly covered with a cover 2, but it may also be one wherein an intermediate layer is provided between the core 1 and cover 2 and the core 1 is covered with the cover 2 on the above intermediate layer. The intermediate layer can be made of either rubber (i.e. vulcanized butadiene rubber) or themoplastic resin (i.e. ionomer resin).

A method of covering the cover 2 on the core 1 is not specifically limited, but may be a method which has hitherto been used. For example, there can be employed a method comprising molding a cover composition into a semispherical half-shell in advance, covering a core 1 with two halfshells and then subjecting to a pressure molding at 130° to 170° C. for 1 to 15 minutes, or a method comprising subjecting the composition for cover to an injection molding directly to cover around the core 1. A thickness of the cover is generally about 1 to 4 mm. When the cover is molded, a dimple may be formed on the surface of the ball, if necessary. Further, if necessary, a paint finishing and stamping may be provided after cover molding.

As described above, according to the present invention, there could be provided a solid golf ball which has soft and good hit feeling and attains a long flying distance.

EXAMPLES

The following Examples and Comparative Examples further illustrate the present invention in detail but are not to be construed to limit the scope thereof.

Examples 1 to 3 and comparative Examples 1 to 5

A rubber composition for core was prepared according to the formulation shown in Tables 1 and 2, respectively. The resulting rubber composition for core was subjected to vulcanization molding in a mold under conditions shown in Tables 1 and 2 to obtain a core having a diameter of 39.2 mm. The formulation and vulcanization condition of Examples 1 to 3 are shown in Table 1, respectively. The formulation and vulcanization condition of Comparative Examples 1 to 5 are shown in Table 2, respectively. The units of the amount in Tables 1 and 2 are by weight, and the details of the common component in Tables 1 and 2 are shown in Table 1.

TABLE 1

|  |  | Example No. | | |
|---|---|---|---|---|
|  |  | 1 | 2 | 3 |
| BR-01 | *1 | 100 | 100 | 100 |
| Zinc acrylate |  | 29 | 29 | 29 |
| Zinc oxide |  | 18.1 | 18.0 | 18.3 |
| Antioxidant | *2 | 0.5 | 0.5 | 0.5 |
| Dicumyl peroxide |  | 3.4 | 2.7 | 4.8 |
| MR-906 | *3 | 2.0 | 1.2 | 3.5 |
| Vulcanizing condition: |  | 145 × 30 | 145 × 30 | 145 × 30 |
| Temperature (°C.) × time (minute) |  | 170 × 10 | 170 × 10 | 170 × 10 |

※1: Trade name, butadiene rubber manufactured by Japan Synthetic Rubber Co., Ltd., amount of cis structure: 94%
※2: Yoshinox 425 (trade name), manufactured by Yoshitomi Seiyaku Co., Ltd.
※3: Trade name, three sorts of mixtures comprising diphenyl disulfide, dixyl disulfide and ditolyl disulfide in a mixing ratio (weight ratio) of 14.5:36.3:49.2, manufactured by Seiko Kagaku Kogyo Co., Ltd.

TABLE 2

|  | Comparative Example No. | | | | |
|---|---|---|---|---|---|
|  | 1 | 2 | 3 | 4 | 5 |
| BR-01 | 100 | 100 | 100 | 100 | 100 |
| Zinc acrylate | 29 | 29 | 29 | 29 | 29 |
| Zinc oxide | 17.8 | 17.8 | 18.6 | 17.9 | 20.0 |
| Antioxidant | 0.5 | 0.5 | 0.5 | 0.5 | 0.5 |
| Dicumyl peroxide | 1.3 | 1.3 | 6.5 | 2.2 | 2.0 |
| MR-906 | 0 | 0 | 5.0 | 0 | 0 |
| Diphenyl disulfide | 0 | 0 | 0 | 0 | 0.5 |
| Vulcanizing condition | 145 × 30 | 145 × 40 | 145 × 30 | 145 × 40 | 145 × 40 |
| Temperature (°C.) × time (minute) | 170 × 10 |  | 170 × 10 |  |  |

The measurement results of the amount of the cis structure, amount of the trans structure of the rubber [BR01 (trade name), i.e. butadiene rubber] before vulcanization as well as those of the rubber after vulcanization are shown in Tables 3 and 4. These were measured by a Fourier transform infrared spectrometer according to a method using ATR and KBR methods in combination.

Furthermore, the hardness, compression strength and impact resilience of the resulting core were measured, respectively. The results are shown in Tables 3 and 4. The hardness of the center of the core, location which is 5 mm away from the center to the surface side (5 mm away from the center), location which is 10 mm away from the center to the surface side (10 mm away from the center), location which is 15 mm away from the center to the surface side (15 mm away from the center) and surface was measured using a JIS-C type hardness tester, respectively. The hardness of the interior of the core was measured by cutting the core at a corresponding location and then measuring the hardness of the cut surface. The description in parentheses at the end of the measuring location means an abbreviation when the measuring location of the hardness is described in Tables 3 and 4.

The compression strength of the core was determined by measuring the compression deformation formed between the initial loading (10 kg) and final loading (130 kg). The impact resilience was determined as follows. That is, a cylindrical metal (198.4 g) was allowed to strike against a golf ball at a speed of 45 m/second using a R & A initial velocity measuring apparatus to measure a velocity of the golf ball. The resulting value is indicated as an index in case of the value of the core of Example 1 being 100.

TABLE 3

|  | Example No. | | |
|---|---|---|---|
|  | 1 | 2 | 3 |
| Before vulcanization |  |  |  |
| Cis structure content (%) | 93.5 | 94.1 | 92.2 |
| Trans structure content (%) | 6.1 | 5.5 | 6.9 |
| After vulcanization |  |  |  |
| Cis structure content (%) | 77.8 | 83.2 | 69.3 |
| Trans structure content (%) | 21.1 | 15.3 | 29.5 |
| Hardness distribution |  |  |  |
| Center | 78 | 76.5 | 74.5 |
| Location which is 5 mm away from the center | 78 | 77 | 75 |
| Location which is 10 mm away from the center | 77.5 | 77.5 | 75 |

TABLE 3-continued

|  | Example No. | | |
|---|---|---|---|
|  | 1 | 2 | 3 |
| Location which is 15 mm away from the center | 78 | 78.5 | 76 |
| Surface | 77 | 77 | 75.5 |
| Compression strength (mm) | 3.0 | 2.9 | 3.1 |
| Impact resilience coefficient (index) | 100 | 99.6 | 99.5 |

TABLE 4

|  | Comparative Example No. | | | | |
|---|---|---|---|---|---|
|  | 1 | 2 | 3 | 4 | 5 |
| Before vulcanization |  |  |  |  |  |
| Cis structure content (%) | 95.2 | 95.2 | 91.0 | 94.8 | 91.3 |
| Trans structure content (%) | 3.9 | 3.9 | 7.5 | 3.2 | 7.2 |
| After vulcanization |  |  |  |  |  |
| Cis structure content (%) | 93.6 | 93.5 | 66.8 | 93.6 | 90.2 |
| Trans structure content (%) | 5.2 | 5.5 | 32.1 | 4.8 | 9.0 |
| Hardness distribution |  |  |  |  |  |
| Center | 78 | 70 | 72 | 70 | 71 |
| Location which is 5 mm away from the center | 78 | 71.5 | 73 | 76 | 72 |

TABLE 4-continued

|  | Comparative Example No. | | | | |
| --- | --- | --- | --- | --- | --- |
|  | 1 | 2 | 3 | 4 | 5 |
| Location which is 10 mm away from the center | 77.5 | 78.5 | 73 | 81 | 74 |
| Location which is 15 mm away from the center | 78.5 | 80 | 73.5 | 83 | 78 |
| Surface | 78 | 82 | 74 | 78 | 80 |
| Compression strength (mm) | 3.0 | 3.1 | 3.2 | 2.6 | 3.4 |
| Impact resilience coefficient (index) | 98.2 | 97.9 | 97.5 | 100 | 97.7 |

Then, the above core is coated with an ionomer resin cover to produce a two-piece solid golf ball having a diameter of 42.7 mm. The composition for cover is that obtained by formulating titanium dioxide in the amount of 2 parts by weight, based on 100 parts by weight of a mixture of Hi-milan 1605 (trade name) and Hi-milan 1706 (trade name) in a weight ratio of 50:50. The above Hi-milan 1605 is an ionomer resin prepared by neutralizing with sodium ion, manufactured by Mitsui Du Pont Polychemical Co., Ltd. and Hi-milan 1706 is an ionomer resin prepared by neutralizing with zinc ion, manufactured by Mitsui Du Pont Polychemical Co., Ltd.

The compression strength and flying distance (carry) of the resulting golf ball were measured and the hit feeling was evaluated. The results are shown in Tables 5 and 6.

The compression strength was determined by measuring a compression deformation formed between the initial loading (10 kg) and final loading (130 kg). The flying distance was determined by hitting a golf ball with a No. 1 wood club mounted to a swing robot manufactured by True Temper Co. at a head sped of 45 m/second and measuring a distance to the falling point (carry) to the ground. The hit feeling was evaluated by practically hitting by 10 professional golfers using a No. 1 wood club.

TABLE 5

|  | Example No. | | |
| --- | --- | --- | --- |
|  | 1 | 2 | 3 |
| Compression strength (mm) | 2.4 | 2.3 | 2.5 |
| Flying distance (yard) | 230.5 | 228.0 | 230.0 |
| Hit feeling | Light, soft and good | Soft and good | Soft and good |

TABLE 6

|  | Comparative Example No. | | | | |
| --- | --- | --- | --- | --- | --- |
|  | 1 | 2 | 3 | 4 | 5 |
| Compression strength (mm) | 2.4 | 2.5 | 2.6 | 2.0 | 2.8 |
| Flying distance (yard) | 227.5 | 226.3 | 225.0 | 230.0 | 224.0 |
| Hit feeling | Slightly hard | Too soft, heavy and dull | Too soft and heavy | Hard | Too soft and heavy |

The formulation, vulcanization conditions, amount of the cis structure before vulcanization, amount of the trans structure after vulcanization, hardness distribution and compression strength of the core as well as impact resilience coefficient and compression strength, flying distance and hit feeling of the resulting golf ball of Examples 1 to 3 are shown in Tables 1, 3 and 5. Those of the core and golf ball of Comparative Examples 1 to 5 are shown in Tables 2, 4 and 6. As shown in Table 5, regarding the golf balls of Examples 1 to 3, the hit feeling was soft and good and flying distance was large.

That is, regarding the golf balls of Examples 1 to 3, the rubber of the core contains not less than 90% of a cis structure content before vulcanization and the amount of the cis structure becomes within a range of 10 to 30% after vulcanization because the amount of the trans structure increases. Furthermore, the hardness distribution of the core is even and difference in hardness between the center of the core and each measuring point is not more than 10%. Therefore, it is considered that the hit feeling is soft and long flying distance is maintained without causing deterioration of resilience performances.

To the contrary, regarding the golf ball of Comparative Example 4, the flying distance was long, however, the hit feeling was hard and inferior, which showed a disadvantage of the solid golf ball as it is. Furthermore, regarding the golf balls of Comparative Examples 1 to 3 and 5, the hit feeling was slightly improved in comparison with the golf ball of Comparative Example 4, but it is not sufficient. The golf balls of Comparative Examples 2 to 3 and 5 were inferior to those of Examples 1 to 3 in flying distance.

What is claimed is:

1. A solid golf ball comprising a core and a cover covering said core, wherein the core has a trans structure content in polybutadiene of 10 to 30%, and wherein said core is produced by vulcanizing a rubber composition containing a butadiene rubber having cis structure content of not less than 90% before vulcanization, as a base rubber, wherein an amount of trans structure after vulcanization is 10 to 30% and a difference in hardness measured by a JIS-C type hardness, tester between the center of the core and each point located from the center to the surface at an interval of 5 mm is not more than 10%.

2. The solid golf ball according to claim 1, further comprising an intermediate layer between the core and the cover.

3. The solid golf ball according to claim 2 wherein said intermediate layer is made of ionomer resin.

4. The solid golf ball according to claim 1 wherein said rubber composition for forming the core comprises a vulcanizing agent, a filler, an organic peroxide and an organo-phosphorus compound, in addition to the butadiene rubber having cis structure content of not less than 90% before vulcanization.

5. The solid golf ball according to claim 1 wherein said base rubber further comprises natural rubber, isoprene rubber styrenebutadiene rubber or ethylene-propylene-diene rubber (EPDM).

6. The solid golf ball according to claim 1 wherein said butadiene rubber containing a cis structure content of not less than 90% is present in an amount of not less than 80% by weight of all rubber components.

7. A process for producing the solid golf ball of claim 1, wherein a core is vulcanized by two-stage vulcanization comprising heating at 135° to 155° C. for 20 to 50 minutes, followed by heating at 160° to 180° C. for 5 to 20 minutes.

8. The solid golf ball according to claim 1 wherein the center of the core has a hardness of 60 to 85 as measured by a JISC C hardness tester.

9. The solid golf ball according to claim 1 wherein the center of the core has a hardness of 65 to 80 as measured by a JIS-C C hardness tester.

* * * * *